Nov. 15, 1966 J. K. SHANNON 3,285,785
STORAGE BATTERY AND METHOD FOR MAKING SAME
Filed Oct. 4, 1963 2 Sheets-Sheet 1
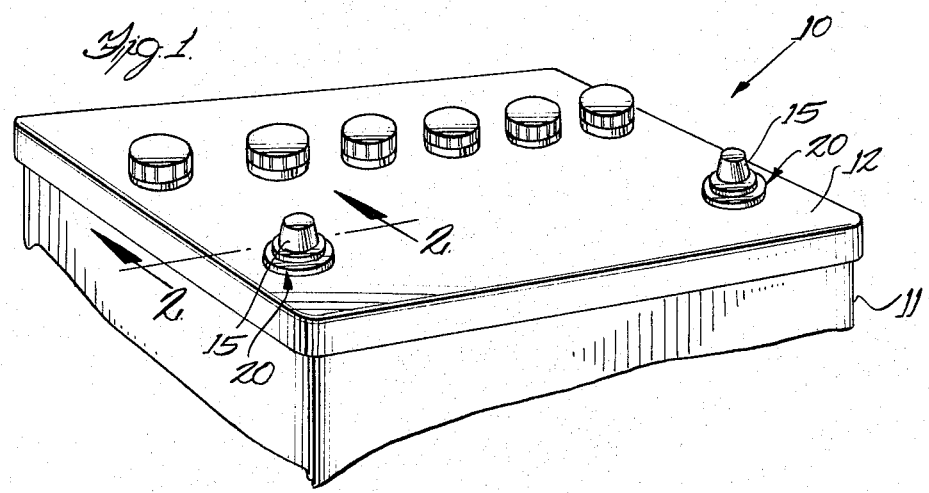
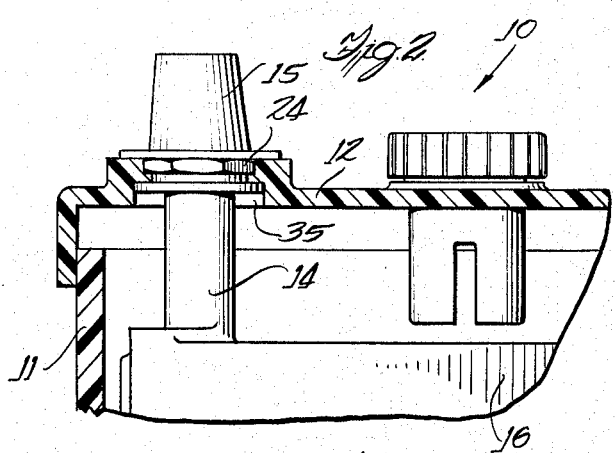
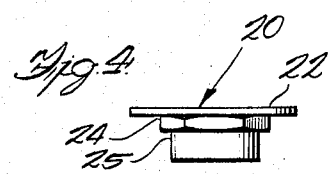
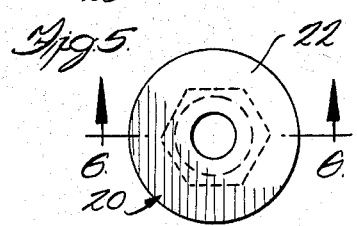
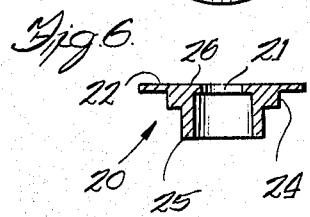
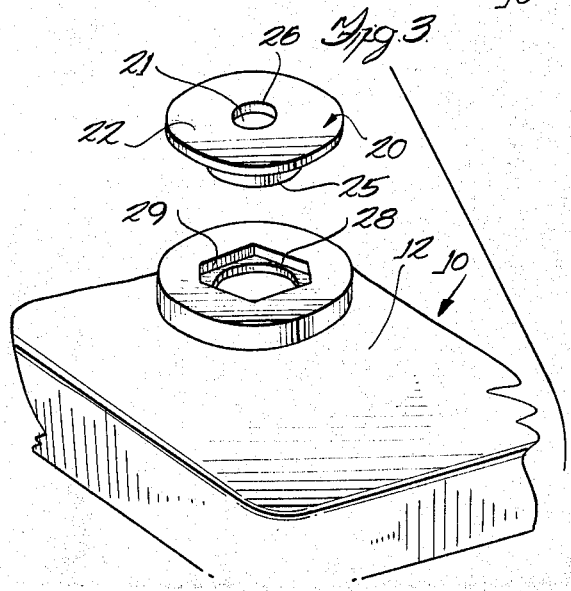
Inventor
John K. Shannon
Dominik, Rudy & Stein
Attorneys

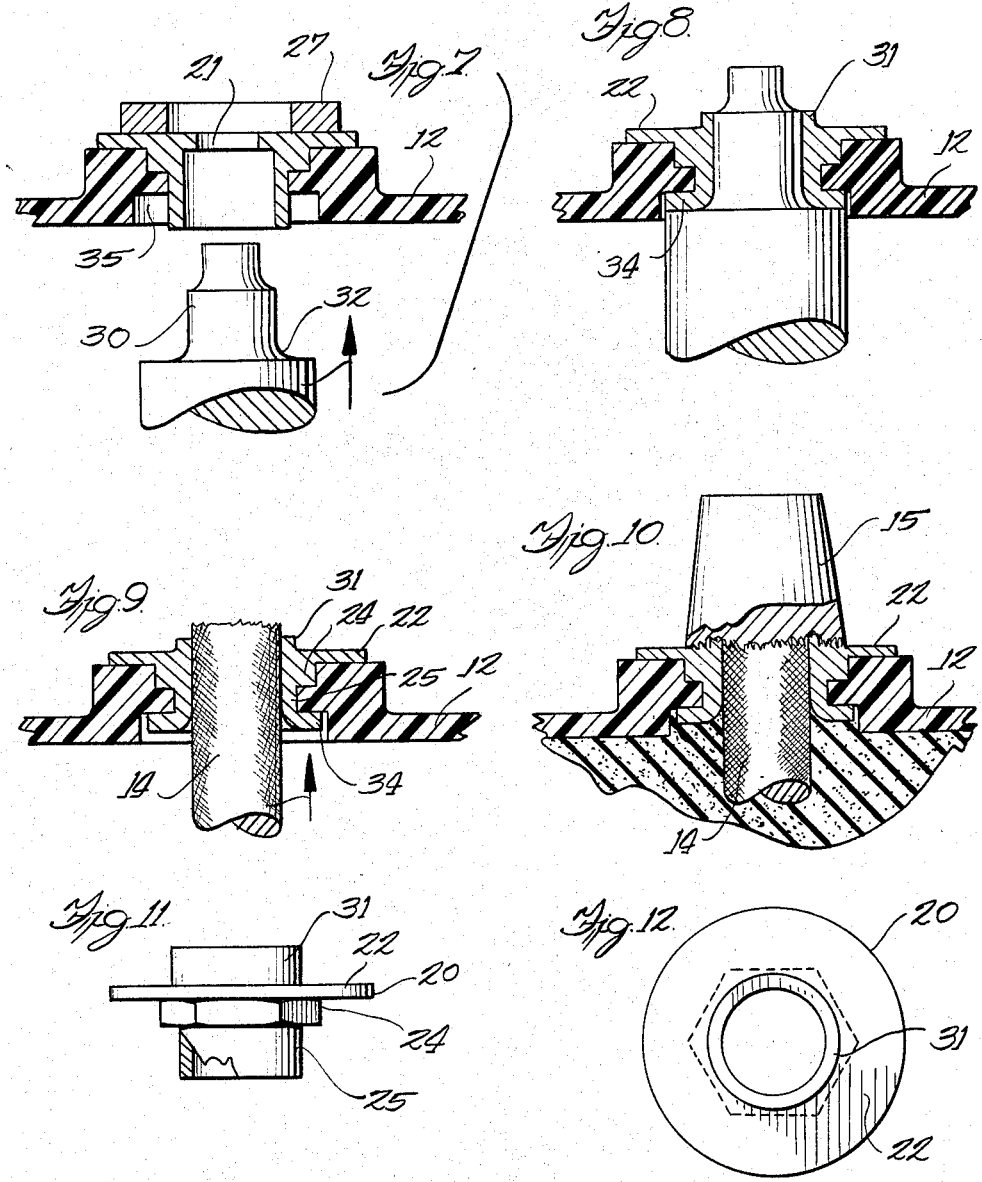

United States Patent Office 3,285,785
Patented Nov. 15, 1966

3,285,785
STORAGE BATTERY AND METHOD FOR MAKING SAME
John K. Shannon, 6504 43rd Ave., Kenosha, Wis.
Filed Oct. 4, 1963, Ser. No. 314,008
8 Claims. (Cl. 136—168)

The present invention relates to a storage battery construction and a method for making the same. More particularly, the invention relates to the construction of the post and its relation to the lid or upper portion of the battery.

In the battery manufacturing techniques presently known, the post or electrode is sometimes threaded into a molded plastic boss in the lid or tray of the battery. Alternatively a metal insert may be permanently molded in the lid at the time of molding the plastic. Thereafter the post is inserted therethrough, and subsequently a torch played about the post to weldingly melt the same into an integral unit. Other constructions contemplate the use of a rubber washer in the upper portion of the battery, the same being employed to sealingly engage the post.

The present invention, however, presupposes a unitary metallic seal forcibly engaging the upper and lower portions of the premolded battery top and prepared for locking engagement therewith to prevent dislodgement at such times as twisting or torsional action is applied to the battery post. More particularly, the invention looks to the provision of a single metallic insert which is either preformed in its final configuration, with the lower tubular portions wedged into position, or formed as a preformed washer with a depending tubular skirt and rectilinear locking portion, the same being positioned in the plastic battery lid and formed while in position to swedgingly engage the battery lid.

In view of the foregoing, one of the principal objects of the present invention is to provide a battery post and lid connector construction which is rugged, inexpensive, and resists torsional action to a substantial degree.

Still another object of the invention looks to a method of manufacturing battery case tops in which the receptacle for the battery post is preformed at the time of molding, and accordingly reduces the man hours required to prepare the casing for its union with the post and battery cells.

Still another object of the invention looks to a method for forming the battery posts which reduces several operational steps, and achieves the end result of a superior seal between the cap and the electrode or post.

Further objects and advantages of the present invention will become apparent as the following description of an illustrative embodiment proceeds, taken in conjunction with the accompanying drawings, for disclosing a preferred embodiment, in which:

FIG. 1 is a partially broken perspective view of the top of a battery employing a terminal construction illustrative of the present invention.

FIG. 2 is an enlarged transverse sectional view taken along section line 2—2 of FIG. 1 and showing the terminal construction in relation to the battery lid.

FIG. 3 is a perspective broken, partially exploded view illustrating the relationship between the seal and lid portion to which the seal is fastened.

FIG. 4 is a front elevation of the seal.

FIG. 5 is a top view of the seal.

FIG. 6 is a transverse sectional view of the seal taken along section line 6—6 of FIG. 5.

FIG. 7 is an enlarged partially diagrammatic, partially broken transeverse sectional view illustrating the relationship between the lid, seal, and forming tool.

FIG. 8 is a view similar to FIG. 7 illustrating the subsequent sequential position of the forming tool.

FIG. 9 is a view taken from the same position as FIGS. 7 and 8 illustrating the subsequent insertion of the terminal post.

FIG. 10 is a view taken from the same position as FIGS. 7 through 9 illustrating the subsequent position and orientation of the terminal which is molded into position.

FIG. 11 is a front elevation of an alternative embodiment seal.

FIG. 12 is a top view of an alternative embodiment seal.

The illustrative battery 10 as disclosed, it will be noted, includes as a principal element a casing 11. Such casings are normally molded from plastic or similar inert and relatively inexpensive materials. It is important that a good seal be provided between the battery terminal 15 or electrode and the cells 16 therebeneath which are mostly immersed in acids of various types. Leakages are to be avoided.

As will be observed, the electrode seal 20, in the preferred embodiment, includes a washer portion 22 with a relatively small central aperture 21. Cast integrally with the washer portion 22 is a hexagonal locking portion 24, the hexagonal locking portion 24 terminating in a short tubular sleeve 25 proportioned to engage the battery terminal 15 or electrode.

As will be observed from the top view, an annular skirt 26 extends inwardly from the inner portion of the battery post sleeve 25. In the course of manufacture, the plastic or other material employed for the manufacture of the lid 12 has a recess 28 cast in the upper portion of approximately the same configuration as the hexagonal shaped locking portion 24. Thereafter the sleeve 25 is inserted downwardly, with its locking portion 24 engaging the mating locking portion 29 of the battery lid 12. The sleeve 25 is then held firmly in position as by a ring 27 and a tapered forming tool 30, or other swedging construction is inserted into the small central aperture 21, and the same is up-set into a peripheral welding skirt 31 extending from the top portion of the battery. At the same time, as the tool is progressively inserted, its base flared-out portion 32 engages the lower portion of the sleeve 25, and swedges the same laterally into a locking flange 34 which physically locks into the recess 35 at the bottom of the battery lid 12, and securely and lockingly engages the same.

When the battery is then assembled, a conventional terminal mold is placed over the top of the post 14, and a torch is played upon the welding skirt 31 until the same melts and fuses integrally with the battery post 14 (see FIGURE 10). The chilling action of the plastic in the lower portion of the sleeve is sufficient to prevent the same from melting too far down the cylindrical interface, and yet insures a complete weld.

An alternative embodiment of the molded insert is shown in FIGURES 11 and 12, where it will be seen that the upper welding skirt 31 and lower tubular sleeve 25 are already preformed as by casting. The same is inserted into the plastic battery cap with its hexagonal locking portion 24 extending into the locking recess 29, and then the base sleeve portion 25 is swedged into locking relationship with the battery lid in the same fashion as described above.

In some instances where it is considered desirable, the battery top and associated cells may be inverted, and a plastic poured into the lid 12 or tray. The present invention, however, does not rely upon this method of final insulation, as an effective seal is achieved through the unique construction of the battery support post and its associated top or tray.

In review it will be seen that not only has there been provided a unique battery lid 12 construction and mating seal 20, but also the method of manufacture is not necessarily the only one whereby the terminal portion 15 may be formed. The terminal 15 may be preformed into its final configuration, and the plastic molded thereabout. The invention, however, is not limited to the particular method of manufacture, nor is it limited to the precise construction as shown, but contemplates alternative embodiments and techniques known in the art for the formation of the final unit.

Although a particular embodiment of the invention has been shown and described in full here, there is no intention to thereby limit the invention to the details of such embodiment. On the contrary, the intention is to cover all modifications, alternatives, embodiments, usages and equivalents of the storage battery construction and method for making the same as fall within the spirit and scope of the invention, specification and the appended claims.

I claim:

1. A metallic weldable seal or use in storage battery terminal assembly comprising a single piece sealing element, said sealing element being characterized by a flat top washer portion, said washer portion terminating in a central aperture, a sleeve depending from said washer portion, said sleeve defining an interior tubular portion and a locking portion depending from said washer portion and radially outwardly from said sleeve portion, the locking portion having rectilinear faces on its periphery to lockingly mate with a pre-formed complementary portion on an associated storage battery lid.

2. A metallic weldable seal for use in storage battery terminal assembly comprising a single piece sealing element, said sealing element being characterized by a flat top washer portion, said washer portion terminating in a central aperture, a sleeve depending from said washer portion, said sleeve defining an interior tubular portion with a cross section larger than the central aperture of the washer portion, and a locking portion depending from said washer portion and radially outwardly from said sleeve portion, the locking portion having rectilinear faces on its periphery to lockingly mate with a pre-formed complementary portion on an associated storage battery lid.

3. A metallic seal for use with a storage battery, said seal comprising a single unitary casting, said casting having a washer portion, a welding skirt of tubular configuration extending upwardly from said washer portion and defining a central open cylindrical portion interiorly thereof, a sleeve depending from said washer portion, said lower sleeve defining a common central cylindrical portion in open communication with the welding skirt interior cylindrical portion, and a locking portion depending from the lower portion of the washer and extending radially from the depending sleeve but terminating short of the periphery of the washer portion, said locking portion having rectilinear faces thereon to lockingly mate with a complementary portion of an associated battery lid.

4. A battery lid and metallic terminal post seal comprising, in combination, a battery lid, said battery lid having an upstanding terminal boss receiving portion, said upstanding terminal boss receiving portion having a recessed locking area, said recessed locking area defining therebeneath a central aperture, and a metallic seal inserted within said boss, said seal having a flat washer portion extending over the locking portion of the lid boss, a seal locking portion depending from said washer portion and having radially spaced faces complementary to the recessed locking portion of the battery terminal boss and inserted therein, a battery post, a central sleeve depending from said washer portion and having a tubular central portion proportioned to receive said battery post, the lower portion of said sleeve being flared out to define a locking flange, said locking flange extending substantially parallel with said washer portion and engaging the underneath portion of the battery lid locking portion, the seal thereby providing a flat metallic welding surface atop the terminal post boss for the molding of a terminal thereupon, the interior portion accommodating said battery post, and the locking flange of said seal in combination with the washer securely fixing the seal within the battery lid.

5. A battery lid and metallic terminal post seal comprising, in combination, a battery lid, said battery lid having an upstanding terminal boss receiving portion, said upstanding terminal boss receiving portion having a recessed locking area, said recessed locking area defining therebeneath a central aperture, and a metallic seal inserted within said boss, said seal having a flat washer portion extending over the locking portion of the lid boss, a seal locking portion depending from said washer portion and having radially spaced faces complementary to the recessed locking portion of the battery terminal boss and inserted therein, a battery post, a central sleeve depending from said washer portion and having a tubular central portion proportioned to receive said battery post, the lower portion of said sleeve being flared out to define a locking flange, said locking flange extending substantially parallel with said washer portion and engaging the underneath portion of the battery lid locking portion, and an upstanding welding skirt of tubular configuration and substantially equal in its tubular central portion to the washer depending sleeve, the seal thereby providing a flat metallic welding surface atop the terminal post boss for the molding of a terminal thereupon, the interior portion accommodating said battery post, and the locking flange of said seal in combination with the washer securely fixing the seal within the battery lid.

6. The method of fixing a moldable metallic seal to a storage battery lid, said storage battery lid having a boss thereupon with means defining a central annular aperture, said aperture having thereabove a recessed locking portion, and said aperture having therebeneath a recessed seal receiving portion, and a metallic seal having a central sleeve with a radially extending top washer portion, a locking portion depending beneath said washer portion and extending radially therefrom in complementary configuration to the locking portion of the battery lid, and a depending locking sleeve extending downwardly from said washer, and means defining a central aperture on said washer the diameter of which is less than the diameter of the depending sleeve, the steps of inserting said metallic seal into the battery lid with the complementary locking portions together, holding the washer portion securely against the battery top, and moving a two-stage swedging tool longitudinally through the central open area of the sleeve, said swedging tool first upsetting the overhanging portion defined by the periphery of the central aperture of the washer portion and deformingly converting the same into a welding skirt extending upwardly from said washer portion, and having a diameter equal to the interior diameter of said sleeve, and then swedging the depending sleeve into a radially extending locking flange beneath the overhanging portion of the locking portion of the battery lid, thereby defining a locked seal construction for the insertion of a battery post and the welding thereof into a battery terminal.

7. The method of fixing a moldable metallic seal to a storage battery lid, said storage battery lid having a boss thereupon with means defining a central annular aperture, said aperture having thereabove a recessed locking portion, and said aperture having therebeneath a recessed seal receiving portion, and a metallic seal having a central sleeve with a radially extending top washer portion, a locking portion depending beneath said washer portion and extending radially therefrom in complementary configuration to the locking portion of the battery lid, and a depending locking sleeve extending downwardly from said washer, and means defining a central aperture on said washer the diameter of which is less than the diameter of the depending sleeve, the steps of inserting said metallic seal into the battery lid with the complementary locking portions together, holding the washer portion securely against the battery top and moving a swedging tool longitudinally through the central open area of the sleeve, said swedging tool upsetting the overhanging portion defined by the periphery of the central aperture of the washer portion and deformingly converting the same into a welding skirt extending upwardly from said washer portion, and having a diameter equal to the interior diameter of said sleeve, and swedging the depending sleeve into a radially extending locking flange beneath the overhanging portion of the locking portion of the battery lid, thereby defining a locked seal construction for the insertion of a battery post and the welding thereof into a battery terminal.

8. The method of fixing a moldable metallic seal to a storage battery lid, said storage battery lid having a boss thereupon with means defining a central annular aperture, said aperture having thereabove a recessed locking portion, and said aperture having therebeneath a recessed seal receiving portion, and a metallic seal having a central sleeve with a radially extending top washer portion, a locking portion depending beneath said washer portion and extending radially therefrom in complementary configuration to the locking portion of the battery lid, and a depending locking sleeve extending downwardly from said washer, the steps of inserting said metallic seal into the battery lid with the complementary locking portions together, holding the washer portion securely against the battery top, and moving a swedging tool longitudinally through the central open area of the sleeve, said swedging tool upsetting the overhanging portion defined by the periphery of the central aperture of the washer portion and deformingly converting the same into a welding skirt extending upwardly from said washer portion, and having a diameter equal to the interior diameter of said sleeve, and swedging the depending sleeve into a radially extending locking flange beneath the overhanging portion of the locking portion of the battery lid, thereby defining a locked seal construction for the insertion of a battery post and the welding thereof into a battery terminal.

References Cited by the Examiner

UNITED STATES PATENTS

| | | | |
|---|---|---|---|
| 2,031,378 | 2/1936 | Lormor | 136—163 X |
| 2,066,675 | 1/1937 | Dunzweiler. | |
| 2,901,527 | 8/1959 | Mocas | 136—168 |

WINSTON A. DOUGLAS, *Primary Examiner.*

D. L. WALTON, *Assistant Examiner.*